Oct. 11, 1932.                G. C. THOMAS, JR                    1,881,980
                                  PIPE COUPLER
                         Filed Dec. 17, 1930          2 Sheets-Sheet 1
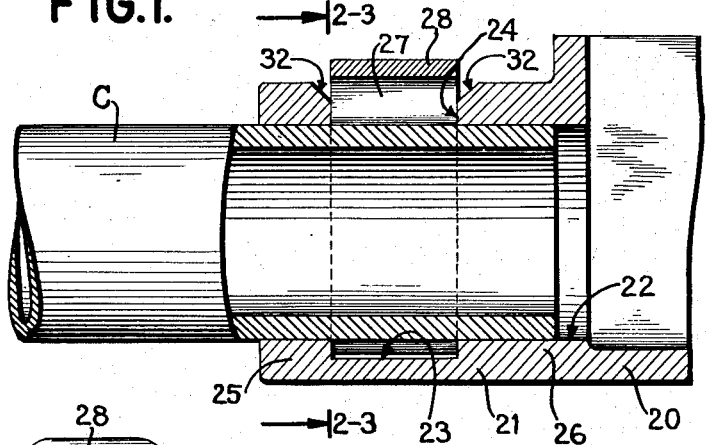
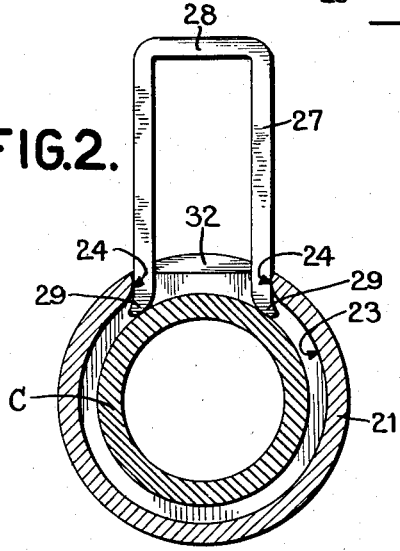
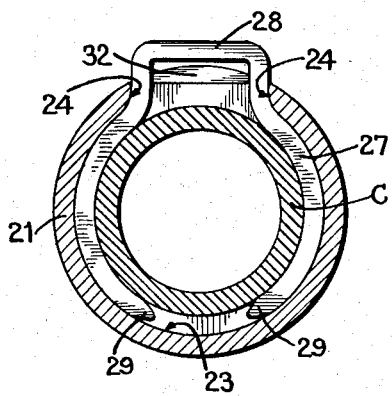
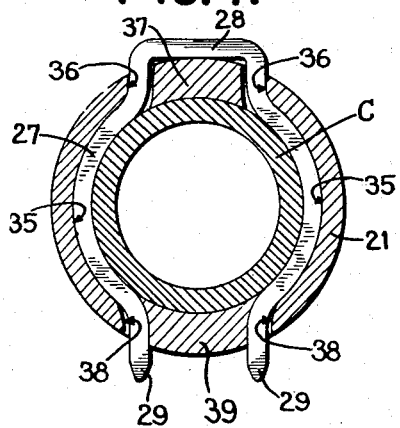
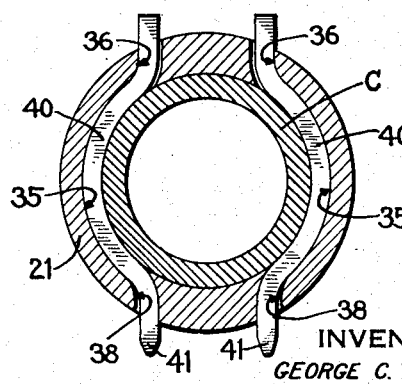
INVENTOR
GEORGE C. THOMAS JR.
BY    ATTORNEY
      John M. Montstream Oct. 11, 1932.  G. C. THOMAS, JR  1,881,980
PIPE COUPLER
Filed Dec. 17, 1930  2 Sheets-Sheet 2
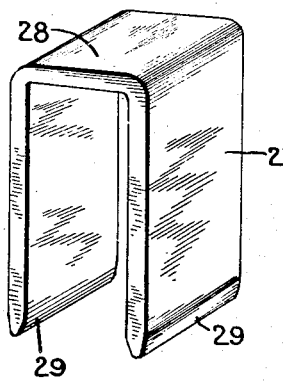
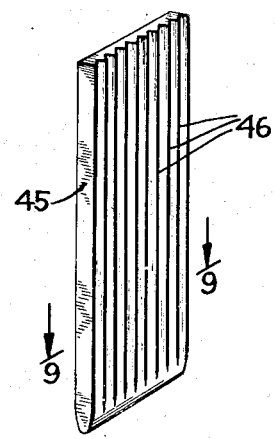
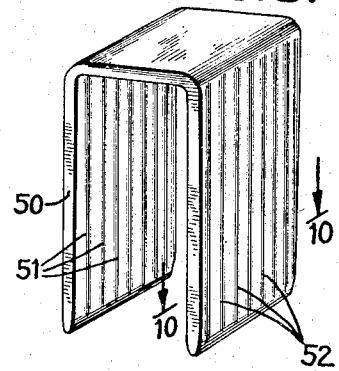
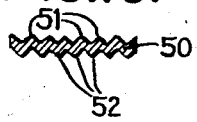
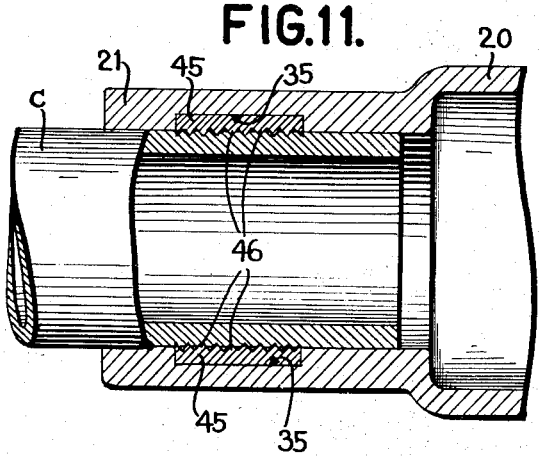
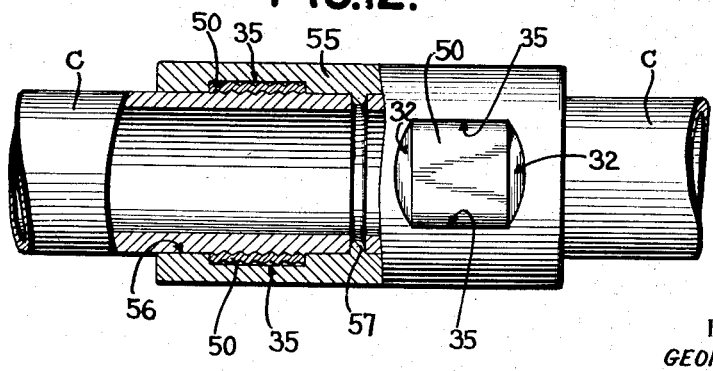
INVENTOR
GEORGE C. THOMAS JR.
BY  ATTORNEY
John M. Montetream Patented Oct. 11, 1932

1,881,980

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

PIPE COUPLER

Application filed December 17, 1930. Serial No. 502,932.

This invention pertains to pipe couplers by means of which an unthreaded pipe or rod may be securely anchored to the coupler which coupler may be part of an outlet box or other structure. The coupler may also be constructed so that the unthreaded ends of two pipes may be securely coupled together.

An object of the invention is to construct a pipe coupler which can be coupled to an unthreaded pipe merely by hammering a locking or securing part of the coupler into locking position and consequently consists of a coupler member having a circumferential space between the outer circumference of the pipe and some part of or substantially all of the inner circumference of the member into which a wedging means is driven or hammered to securely anchor the pipe within the coupler.

The object of the invention is in particular to provide a coupler member having a bore, part or substantially all of which is somewhat greater in diameter than the diameter of the pipe to be anchored therein and supporting the pipe centrally of the bore. A wedging device which has a thickness approximating the radial extent or depth of the space between the outer circumference of the pipe and the inner circumference of the bore, is driven circumferentially into the space between the pipe wall and the bore of the coupler to securely anchor the pipe therein.

Other objects of the invention will be more apparent from the following description taken in connection with the accompanying drawings, in which:

Figure 1 is a section through an outlet box and coupler carried thereby in which the wedging means has been driven into position to securely anchor a pipe therein.

Figure 2 is a cross-section taken on line 2—2 of Figure 1 with the wedging device placed in position preparatory to driving it into the space between the pipe and the coupler member to securely anchor the pipe therein.

Figure 3 is a cross-section taken on line 3—3 of Figure 1 showing the wedging device driven into position and thereby anchoring the pipe within the coupler.

Figure 4 is a cross-section through a pipe coupler so constructed that the ends of the wedging device project beyond the outer circumference of the coupler when driven into position.

Figure 5 is a cross-section through the coupler showing two separate wedging devices driven into position to anchor a pipe within the coupler.

Figure 6 is a perspective view of a U-shaped form of wedging device.

Figure 7 is a perspective view of a simple wedging device having biting ridges upon one face thereof.

Figure 8 is a perspective view of a U-shaped wedging device having biting ridges upon both the inner and outer surfaces thereof.

Figure 9 is a section taken on line 9—9 of Figure 7 showing the biting ridges upon the surface of a wedging device.

Figure 10 is a section taken on line 10—10 of Figure 8 showing the biting ridges upon both surfaces of the wedging device.

Figure 11 is a cross-section through the coupler showing a wedging device having biting ridges anchoring the pipe within the coupler with the biting ridges cut into the surface of the pipe.

Figure 12 is a partial section of a pipe coupler by means of which the unthreaded ends of two pipes are securely coupled together and utilizing a wedging device in which both surfaces thereof are provided with biting or cutting ridges.

The coupler as shown in Figure 1, may be utilized to secure the unthreaded end of a conduit C to some other structure, such as an outlet box 20. In such construction the outlet box has an extension or coupler member 21 having a bore 22 to receive the unthreaded end of the conduit C so that the coupler member takes the form of a shell. The shell or coupler member 22 in one construction has a groove 23 around the bore 22 which may extend around the entire circumference of the bore or not as desired, as will be further described hereinafter. The groove 23 may be provided with at least one passage 24 leading to the outer circumference of the coupler member 21.

A wedging means 27 which in one construction is a U-shaped member having a head 28, is driven into the groove 23 through the passage 24. The wedging means 27 is of sheet material thin enough to bend around the conduit pipe C when hammered into the groove 23 and has a thickness approximately equal to the depth of the groove 23. Each end of the wedging means may be bluntly pointed for a purpose to be described subsequently herein.

The pipe is anchored within the coupler by inserting the wedging means 27 into the passage 24 in the coupler member 21 and hammering on the head 28 so that one end or leg of the wedging means 27 is driven around one side of the conduit C and the other leg is driven around the other side into the clearance space or groove 23 in the coupler member. The legs of the wedging means 27 bend around the pipe in opposite directions and securely anchor the pipe therein. In order to assist the ends 29 of the wedging means to bend around the pipe or conduit C, the ends are bluntly pointed as shown.

As referred to above, the groove 23 within the bore 22 of the coupler member 21 which passes completely around the bore is only one of several constructions available for practicing the invention. Although a groove is shown in the drawings, the groove, however, is in effect nothing more than a clearance space between the outer circumference of the pipe and the inner circumference of the bore in which means are provided, such as the remainder of the bore which snugly fits the conduit, for supporting the conduit centrally of the bore 35 and forming a clearance space around the whole circumference or any part thereof into which a wedging means is driven circumferentially. Irrespective of whether a groove or a clearance space with means to support the pipe in central position within the bore is provided, the wedging means driven thereinto has a thickness approximating the radial depth of the groove or clearance space between the outer circumference of the conduit to be anchored in the coupler member 21 and the inner circumference of the bore 22 of the coupler member. As shown in Figure 3, the wedging means 27 wraps around the pipe within the clearance space or groove 23 and securely anchors the conduit C therein.

The wedging means 27 may be driven into the clearance space as far as may be desired. Preferably, however, the wedging means 27 is driven into the groove 23 so that the head 28 of the wedging means is flush with or substantially flush with the outer circumference of the coupler member. In this position the overall dimension of the coupler is a minimum. It may be necessary or desirable to release the pipe from within the coupler member 21 at some later time in which case the wedging means 27 must be withdrawn from the clearance space or groove 23. If the head 28 has been driven well into the passage 24, it will be extremely difficult to obtain a grip upon the wedging means so that it may be withdrawn therefrom. The inclined recess 32 is therefore provided at least upon one end of the passage 24 so that a tool may be inserted therein and underneath the head 28 of the wedging means and thereby permitting the wedging means to be pried upwardly and out of the groove or clearance space 23 when the head 28 of the wedging means 27 has been driven deeply into the passage 24.

In the construction shown in Figure 1, the groove 23 extends around the entire circumference of the bore. The groove need not necessarily extend around the entire circumference and, as shown in Figure 4, a clearance space or a pair of grooves 35, may be used each of which extends around something less than half the circumference of the bore. In this construction the grooves 35 may have separate passages 36 for the insertion of the wedging means 27 thereby forming a pair of spaced passages from the outer circumference of the coupler member 21 to the groves 35. In this construction the wedging means 27 cannot be driven further into the grooves 35 than the head 28 will permit by abutting the central portion 37 between the spaced passages 36.

The grooves 35 at their other end may have a passage 38 leading to the exterior of the coupler member 21 so that when the wedging means 27 is driven into the grooves 35 the ends 29 thereof project beyond the outer circumference of the member. In order to remove the wedging means 27 in case it is desired to uncouple the pipe therefrom, the ends 29 may be hammered down which will raise the head 28 sufficiently to enable a tool to be inserted between the head 28 and the central portion 37 to pry the wedging means out of the coupler member and grooves 35. Where the grooves 35 are provided with separate spaced passages 36 extending to the outer circumference of the coupler member 21, the legs of the wedging means 27 must be spaced from each other a distance equal to the spacing of the passages 36 as will be understood.

The wedging means shown in Figures 1 through 4 is of the U-shaped form and it is clear that the wedging means may be a single straight strip, such as that shown in Figure 5. The single wedging means 40 shown herein is driven into the groove 35 in the same manner that the U-shaped wedging means 27 is driven therein. This form of wedging means may also be utilized with the form of clearance space or grooves 23 shown in Figures 1 through 3.

Where the wedging means 40 is driven into a groove 35 which does not extend completely around the inner bore of the coupler member 21 and in which outwardly extending passages 38 are provided, the wedging means 40 may be driven thereinto so that the ends 41 project outwardly from the passages 38. In order to remove such wedging means the ends 41 may be hammered until sufficient length of the wedging means 40 projects out of the passage 36 so that pliers or some other tool, may obtain a good grip thereupon to draw it out of the groove. A separate wedging means 40 may be provided for each groove 35 if desired, but it is clear that only one wedging means driven into one of the grooves 35 will retain the pipe within the coupler member 21, although such conduit will not be as securely anchored within the coupler as it would be if two wedging means 40 were utilized.

Where the conduit to be anchored within the coupler is part of an electrical wiring system, it is important that a good electrical connection be made between the coupler and the conduit. In order to obtain such good electrical connection, the wedging means 45 may be provided upon its inner face with biting or cutting ridges 46. These ridges bite into the surface of the conduit C and obtain good electrical contact with the pipe and in addition thereto, more securely anchor the conduit within the coupler member. Such cutting or biting ridges 46 may be provided upon either the single wedging means shown in Figure 7, or may be provided uopn the U-shaped wedging means.

Not only the inner surface of the wedging means may have the biting or cutting ridges, but both of the faces of the wedging means may have such ridges and Figure 8 shows a U-shaped type of wedging means 50 having ridges 51 upon its inner face and ridges 52 upon its outer face, as shown more clearly in the section in Figure 10. The ridges on the inner face bite into the surface of the conduit, as shown in Figure 12, and the outer ridges 52 bite into the surface of the groove 35 or bore of the coupler member so that good electrical contact is assured between the pipe and the coupler member as well as more securely anchoring the conduit within the coupler. It is clear that the ridges may be provided upon both faces of the single wedging means as well as the U-shaped wedging means.

As referred to in a general manner above, the coupler may be constructed to firmly secure together the unthreaded ends of two conduits. Such a construction is shown in Figure 12 in which the coupler member 55 has an internal bore 56 to receive the unthreaded ends of the conduit C. The coupler member 55 has either a single groove 23 as shown in Figure 2, or a pair of grooves 35, as shown in section in Figure 4, to receive the wedging means 50.

Another pair of clearance spaces or grooves 35 are provided adjacent the other end of the coupler member 55 to receive a second wedging means 50 to secure the unthreaded end of a second conduit C within the coupler member 55. This type of coupler will securely anchor together the unthreaded ends of two conduits C. A centering ring 57 may be provided within the bore 56 of the coupler member 55 to center the ends of the two conduits C.

The pipe coupler described herein may be constructed in numerous ways, one of which consists essentially of a coupler member having a bore which is larger than the conduit to be received therein so that a clearance space exists around the conduit into which a wedging means is circumferentially driven. In such construction means are provided for retaining the conduit centrally of the bore which means may be circumferential rings which snugly fit the conduit, such as the rings 25 and 26 of Figure 1, or this means may be diametrical portions such as the portions 37 and 39 of Figure 4. The rings 25 and 26 enable the clearance space to circle the entire circumference of the pipe whereas the portions 37 and 39 permit the clearance space to circle only a part of the circumference of the pipe or conduit C. The clearance space may if desired take the form of a groove 23 within the bore 22 of the coupler member 21, which groove may or may not pass around the entire circumference of the bore as desired. The clearance space or groove may therefore extend around any part of the circumference of the bore as desired. Similarly the coupler member may be provided with one or more clearance spaces or grooves which may be described as at least one clearance space or groove which may extend completely around the circumference of the bore or any part of the circumference.

A wedging means is driven into the clearance space or groove to securely anchor a conduit therein. The wedging means has a thickness approximately equal to the depth of the groove or clearance space so that the conduit is securely anchored to the coupler member. The wedging means may be U-shaped in form or may be a single flat element. Where the single element wedging means such as shown in Figure 7 is used, at least one groove may be provided in the coupler member for each wedging means with at least one passage within the coupler member for each wedging means leading to the clearance space or groove.

Where the U-shaped type of wedging means is utilized, the groove may have a single passage or one pair of spaced passages leading to the clearance space or groove and spaced apart a distance substantially equal to the distance in which the legs of the U-shaped wedging means are spaced apart. Similarly both ends of the grooves or clearance space may terminate in passages to the outer circumference of the coupler member so that the end of each wedging means may project beyond the outer circumference of the member and permit the end thereof to be hammered and thereby assist in driving the wedging means out of the groove in order to uncouple the conduit or pipe from the coupler.

What is claimed is:

1. A pipe coupler comprising a coupler member having a bore to receive the end of a pipe, a curved groove within said bore having a pair of spaced passages leading to the outer circumference of the member, and a U-shaped and bendable wedging means having legs spaced apart equal to the spacing of the passages and approximately in thickness the depth of the groove, the wedging means being driven into the groove through the passages to anchor a pipe within the coupler.

2. A pipe coupler comprising a coupler member having a bore to receive the end of a pipe, a curved groove within the bore having a pair of spaced passages leading to the outer circumference of the member, a U-shaped and bendable wedging means having legs joined by a head and spaced apart a distance equal to spacing of the passages, the wedging means approximating in thickness the depth of the groove and driven thereinto through the passages to anchor a pipe within the coupler, and a recess at least at one end of the passages permitting access to beneath the head of the wedging means.

3. A pipe coupler comprising a coupler member having a bore to receive the end of a pipe, a curved groove within said bore having a pair of spaced passages leading to the outer circumference of the member, a U-shaped and bendable wedging means having legs spaced apart a distance equal to the spacing of the passages and approximating in thickness the depth of the groove, the wedging means being driven into the groove through the spaced passages to anchor a pipe within the coupler, and longitudinal ridges upon the inner faces of the wedging means to bite into the pipe.

4. A pipe coupler comprising a coupler member having a bore to receive the end of a pipe, a curved groove within the bore having a pair of spaced passages leading to the outer circumference of the member, a U-shaped and bendable wedging means having legs spaced apart a distance equal to the spacing of the passages and approximating in thickness the depth of the groove, the wedging means being driven into the groove through the spaced passages to anchor a pipe within the coupler, and ridges upon both faces of the legs to bite into the pipe and the coupler member.

5. A pipe coupler comprising a coupler member having a bore to receive a conduit, a circumferential groove within the bore having at least one passage leading to the outer circumference of the member, and a bendable wedging means for each passage approximating in thickness the depth of the groove and driven thereinto through the passage to anchor the conduit within the coupler.

6. A pipe coupler comprising a coupler member having a bore to receive a conduit, a circumferential groove within the bore having a passage leading to the outer circumference of the member, and bendable wedging means approximating in thickness the depth of the groove and driven thereinto through the passage to circle the conduit in both directions from the passage to anchor the conduit within the coupler.

7. A pipe coupler comprising a coupler member having a bore to receive a conduit, a circumferential groove within the bore having a passage leading to the outer circumference of the member, and a bendable U-shaped wedging means approximating in thickness the depth of the groove and driven thereinto through the passage, each leg of the U circling the conduit in opposite directions from the passage to anchor the conduit within the coupler.

8. A pipe coupler comprising a coupler member having a bore to receive a conduit, a pair of curved grooves diametrically opposite each other within the bore having a passage at each end leading to the outer circumference of the member, and a bendable wedging means for each passage approximating in thickness the depth of the groove and longer than the groove driven thereinto through the passage to anchor the conduit within the coupler.

9. A pipe coupler comprising a coupler member having a bore to receive a conduit, a pair of curved grooves diametrically opposite each other within the bore having a passage at each end leading to the outer circumference of the member, and a U-shaped and bendable wedging means for each passage approximating in thickness the depth of the groove and longer than the groove driven thereinto through the passage to anchor the conduit within the coupler.

In testimony whereof I affix my signature.

GEORGE C. THOMAS, JR.